United States Patent
Noda

(10) Patent No.: US 8,369,692 B2
(45) Date of Patent: Feb. 5, 2013

(54) DISK REPRODUCING APPARATUS AND REPRODUCING METHOD THEREOF

(75) Inventor: Ryusuke Noda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 2436 days.

(21) Appl. No.: 11/029,499

(22) Filed: Jan. 6, 2005

(65) Prior Publication Data

US 2005/0163482 A1     Jul. 28, 2005

(30) Foreign Application Priority Data

Jan. 7, 2004   (JP) .............................. P.2004-001620

(51) Int. Cl.
*H04N 5/84* (2006.01)
*H04N 5/89* (2006.01)

(52) U.S. Cl. ....................................... 386/332; 386/335

(58) Field of Classification Search .......... 386/1, 45–46, 386/95–96, 111, 125–126, 248, 332–336
See application file for complete search history.

(56) References Cited

U.S. PATENT DOCUMENTS 6,804,183 B2 * 10/2004 Ikeda et al. ................. 369/53.37
7,177,528 B1 * 2/2007 Yada et al. ..................... 386/111

FOREIGN PATENT DOCUMENTS

JP    A-2002-251818    9/2002

* cited by examiner

*Primary Examiner* — Thai Tran
*Assistant Examiner* — Nigar Chowdhury
(74) *Attorney, Agent, or Firm* — Morgan, Lewis & Bockius LLP

(57) ABSTRACT

A video and sound signal recorded on an optical disk is reproduced and when a read error of the video and sound signal occurs during the reproduction of the optical disk, reading of the video and sound signal is retried and when a read error of the video and sound signal occurs during the retry of the reading of the video and sound signal, a rotational speed of the optical disk is increased to retry reading of the video and sound signal and when the video and sound signal can be read by the retry of the reading of the video and sound signal, the rotational speed of the optical disk is returned to the original rotational speed and the video and sound signal recorded on the optical disk is reproduced.

7 Claims, 3 Drawing Sheets

DISK REPRODUCING APPARATUS AND REPRODUCING METHOD THEREOF

BACKGROUND OF THE INVENTION

1. Field of the Invention

The present invention relates to a disk reproducing apparatus for reproducing a video and sound signal recorded on an optical disk such as a DVD (Digital Versatile Disc) or a CD (Compact Disc), and more specifically relates to a disk reproducing apparatus capable of reducing noise associated with rotation of an optical disk to reproduce the optical disk and reproducing the optical disk without discontinuity in video and sound in reproduction even when a read error of a video and sound signal occurs during reproduction of the optical disk.

2. Description of the Related Art

A disk reproducing apparatus for reproducing an optical disk such as a DVD or a CD is constructed so that an error of a video and sound signal read from the optical disk can be corrected based on an error-correcting code added to the video and sound signal to reproduce the video and sound signal even when small dirt or flaw, etc. is present on a signal record surface of the optical disk. However, in case that a read error of a video and sound signal occurs and the error of the video and sound signal cannot be corrected due to external factors such as shock or vibration or internal factors such as dirt or flaw on the signal record surface of the optical disk, there was a problem that reading of the video and sound signal must be retried and when retries of the video and sound signal are repeated frequently, data of buffer memory in which the video and sound signal reproduced is temporarily stored is lost and the video and sound signal cannot be outputted at a constant transfer rate and video and sound in reproduction discontinue. Also, when an optical disk is rotated at high speed and a video and sound signal recorded on the optical disk is reproduced in a high-speed mode, a reproduction speed of the video and sound signal improves, but there was a problem that mass buffer memory is required in order to temporarily store the video and sound signal reproduced and noise such as rotation noise of the optical disk, vibration noise due to side runout or eccentricity of the optical disk or wind noise due to rotation of the optical disk increases as compared with the case of rotating the optical disk at low speed. Also, when an optical disk is rotated at low speed and a video and sound signal recorded on the optical disk is reproduced in a low-speed mode, capacity of buffer memory in which data of the video and sound signal reproduced is temporarily stored can be decreased and noise such as rotation noise of the optical disk, vibration noise due to side runout or eccentricity of the optical disk or wind noise due to rotation of the optical disk can be reduced, but there was a problem that when a read error of the video and sound signal occurs, a rotational speed of the optical disk is low and so the number of retries of reading of the video and sound signal of a sector in which the read error of the video and sound signal occurs decreases and data of the buffer memory in which the video and sound signal reproduced is temporarily stored is lost and the video and sound signal cannot be outputted at a constant transfer rate and video and sound in reproduction discontinue.

As a related art, there was means constructed so that when a read error of a video and sound signal occurs in the case of reproducing information recorded on a record medium, by retries of reading of the video and sound signal, a rotational speed of the record medium is decelerated to perform reproduction and it is checked whether or not there is a mechanism for correcting the read error of the video and sound signal in a minimum unit block of information about the record medium and time for deciding whether or not the rotational speed of the record medium is returned is determined based on the check result and the rotational speed of the record medium is returned to the original rotational speed before the deceleration when subsequent information can be reproduced without further decelerating the rotational speed of the record medium by retries of the reading of the video and sound signal during the time determined (for example, see JP-A-2002-251818).

SUMMARY OF THE INVENTION

However, the device described in the related art was the means constructed so that when a read error of a video and sound signal occurs in the case of reproducing information recorded on a record medium, by retries of reading of the video and sound signal, a rotational speed of the record medium is decelerated to perform reproduction and it is checked whether or not there is a mechanism for correcting the read error of the video and sound signal in a minimum unit block of information about the record medium and time for deciding whether or not the rotational speed of the record medium is returned is determined based on the check result and the rotational speed of the record medium is returned to the original rotational speed before the deceleration when subsequent information can be reproduced without further decelerating the rotational speed of the record medium by retries of the reading of the video and sound signal during the time determined, and was not device constructed so that noise such as rotation noise of an optical disk, vibration noise due to side runout or eccentricity of the optical disk or wind noise due to rotation of the optical disk is reduced and a video and sound signal recorded on the optical disk is reproduced and even when a read error of the video and sound signal occurs, video and sound in reproduction do not discontinue.

The invention is implemented in view of such a problem which the related art has. It is an object of the invention to provide a disk reproducing apparatus in which noise such as rotation noise of an optical disk, vibration noise due to side runout or eccentricity of the optical disk or wind noise due to rotation of the optical disk can be reduced to reproduce a video and sound signal recorded on the optical disk and video and sound in reproduction can be constructed so as not to discontinue even when a read error of the video and sound signal occurs during reproduction of the optical disk.

According one aspect of the invention, a disk reproducing apparatus for reproducing a video and sound signal recorded on an optical disk comprises reproducing device for reproducing the video and sound signal recorded on the optical disk, first retry device for retrying reading of the video and sound signal when a read error of the video and sound signal occurs during the reproduction of the optical disk by the reproducing device, second retry device for increasing a rotational speed of the optical disk to retry reading of the video and sound signal when a read error of the video and sound signal occurs during the retry of the reading of the video and sound signal by the first retry device, and reproducing control device for returning the rotational speed of the optical disk to the original rotational speed to reproduce the video and sound signal recorded on the optical disk when the video and sound signal can be read by the retry of the reading of the video and sound signal by the second retry device.

The reproducing device could be constructed so as to reproduce the video and sound signal recorded on the optical disk in a predetermined low-speed mode.

The first retry device could be constructed so as to retry reading of the video and sound signal of a sector in which a read error occurs in a predetermined low-speed mode.

The second retry device could be constructed so as to increase a rotational speed of the optical disk to retry reading of the video and sound signal of a sector in which a read error occurs in a predetermined high-speed mode.

The reproducing control device could be constructed so as to return the rotational speed of the optical disk to the original rotational speed to reproduce the video and sound signal recorded on the optical disk in a predetermined low-speed mode when the video and sound signal of a sector in which a read error occurs can be read by the retry of the reading of the video and sound signal by the second retry device.

By these device, noise such as rotation noise of the optical disk, vibration noise due to side runout or eccentricity of the optical disk or wind noise due to rotation of the optical disk can be reduced to reproduce the video and sound signal recorded on the optical disk, and video and sound in reproduction can be constructed so as not to discontinue even when a read error of the video and sound signal occurs during reproduction of the optical disk.

[Advantage of the Invention]

According to another aspect of the invention, it is constructed so that a video and sound signal recorded on an optical disk is reproduced in a predetermined low-speed mode and reading of the video and sound signal of a sector in which a read error occurs is retried in a predetermined low-speed mode when the read error of the video and sound signal occurs during the reproduction of the optical disk and a rotational speed of the optical disk is increased to retry reading of the video and sound signal of a sector in which a read error occurs in a predetermined high-speed mode when the read error of the video and sound signal occurs during the retry of the reading of the video and sound signal and the rotational speed of the optical disk is returned to the original rotational speed to reproduce the video and sound signal recorded on the optical disk in a predetermined low-speed mode when the video and sound signal of a sector in which a read error occurs can be read by the retry of the reading of the video and sound signal, so that noise such as rotation noise of the optical disk, vibration noise due to side runout or eccentricity of the optical disk or wind noise due to rotation of the optical disk can be reduced to reproduce the video and sound signal recorded on the optical disk, and video and sound in reproduction can be constructed so as not to discontinue even when a read error of the video and sound signal occurs during reproduction of the optical disk.

According to another aspect of the invention, it is constructed so that a video and sound signal recorded on an optical disk is reproduced and reading of the video and sound signal is retried when the read error of the video and sound signal occurs during the reproduction of the optical disk and a rotational speed of the optical disk is increased to retry reading of the video and sound signal when the read error of the video and sound signal occurs during the retry of the reading of the video and sound signal and the rotational speed of the optical disk is returned to the original rotational speed to reproduce the video and sound signal recorded on the optical disk when the video and sound signal can be read by the retry of the reading of the video and sound signal, so that video and sound in reproduction can be constructed so as not to discontinue even when a read error of the video and sound signal occurs during reproduction of the optical disk.

According to another aspect of the invention, it is constructed so as to reproduce the video and sound signal recorded on the optical disk in a predetermined low-speed mode, so that noise such as rotation noise of the optical disk, vibration noise due to side runout or eccentricity of the optical disk or wind noise due to rotation of the optical disk can be reduced to reproduce the video and sound signal recorded on the optical disk.

According to another aspect of the invention, it is constructed so as to retry reading of the video and sound signal of a sector in which a read error occurs in a predetermined low-speed mode, so that noise such as rotation noise of the optical disk, vibration noise due to side runout or eccentricity of the optical disk or wind noise due to rotation of the optical disk can be reduced.

According to another aspect of the invention, it is constructed so as to increase a rotational speed of the optical disk to retry reading of the video and sound signal of a sector in which a read error occurs in a predetermined high-speed mode, so that video and sound in reproduction can be constructed so as not to discontinue even when a read error of the video and sound signal occurs during reproduction of the optical disk.

According to another aspect of the invention it is constructed so as to return the rotational speed of the optical disk to the original rotational speed to reproduce the video and sound signal recorded on the optical disk in a predetermined low-speed mode when the video and sound signal of a sector in which a read error occurs can be read by the retry of the reading of the video and sound signal, so that noise such as rotation noise of the optical disk, vibration noise due to side runout or eccentricity of the optical disk or wind noise due to rotation of the optical disk can be reduced to reproduce the video and sound signal recorded on the optical disk.

According to another aspect of the invention, it is constructed so that a video and sound signal recorded on an optical disk is reproduced in a predetermined low-speed mode and reading of the video and sound signal of a sector in which a read error occurs is retried in a predetermined low-speed mode when the read error of the video and sound signal occurs during the reproduction of the optical disk and a rotational speed of the optical disk is increased to retry reading of the video and sound signal of a sector in which a read error occurs in a predetermined high-speed mode when the read error of the video and sound signal occurs during the retry of the reading of the video and sound signal and the rotational speed of the optical disk is returned to the original rotational speed to reproduce the video and sound signal recorded on the optical disk in a predetermined low-speed mode when the reading of the video and sound signal is retried in the predetermined high-speed mode and the video and sound signal of a sector in which a read error occurs can be read, so that noise such as rotation noise of the optical disk, vibration noise due to side runout or eccentricity of the optical disk or wind noise due to rotation of the optical disk can be reduced to reproduce the video and sound signal recorded on the optical disk, and video and sound in reproduction can be constructed so as not to discontinue even when a read error of the video and sound signal occurs during reproduction of the optical disk.

BRIEF DESCRIPTION OF THE DRAWINGS

These and other objects and advantages of this invention will become more fully apparent from the following detailed description taken with the accompanying drawings in which.

DESCRIPTION OF THE PREFERRED EMBODIMENTS

Figure 1:
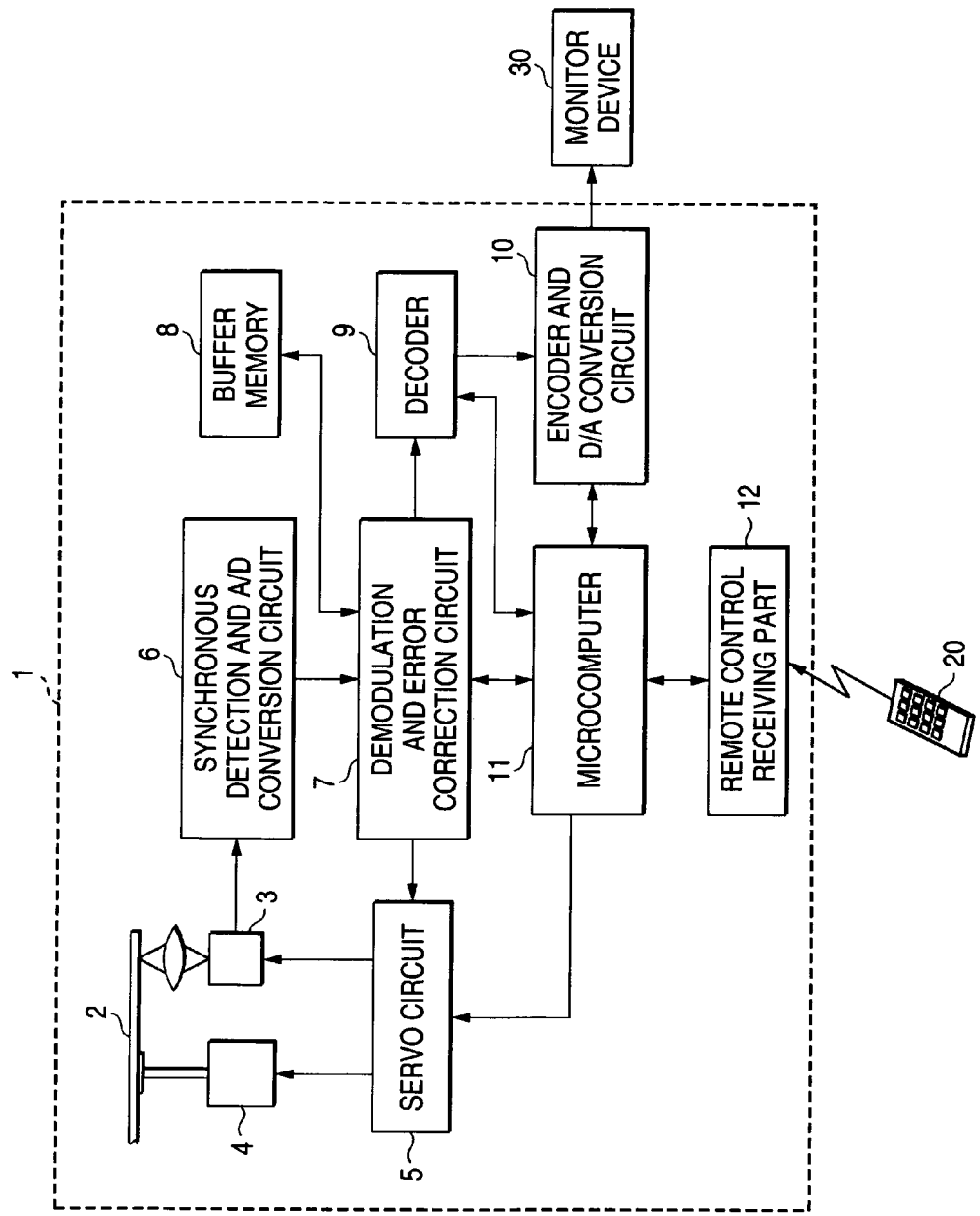
FIG. 1 is a block diagram showing a configuration of a disk reproducing apparatus of one embodiment of the invention.
Figure 3:
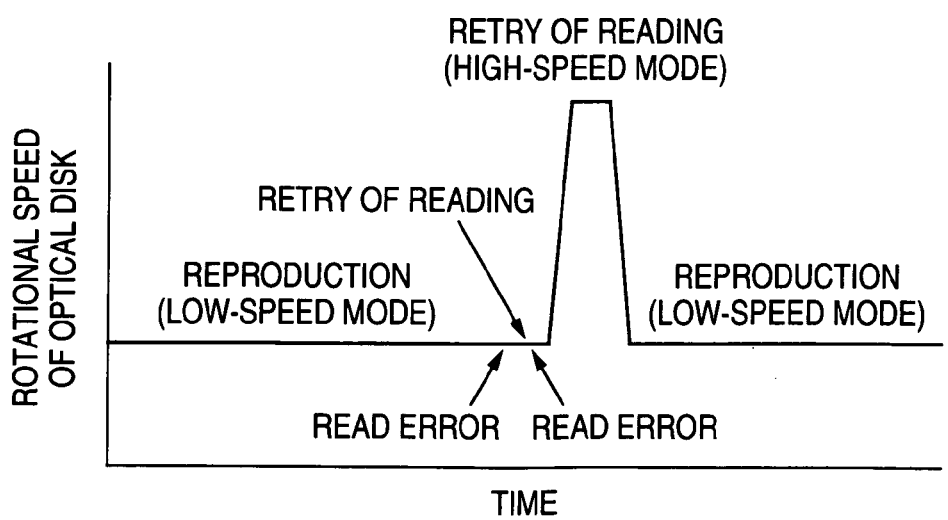
FIG. 3 is an explanatory diagram showing an action of the disk reproducing apparatus of one embodiment of the invention.
Figure 4:
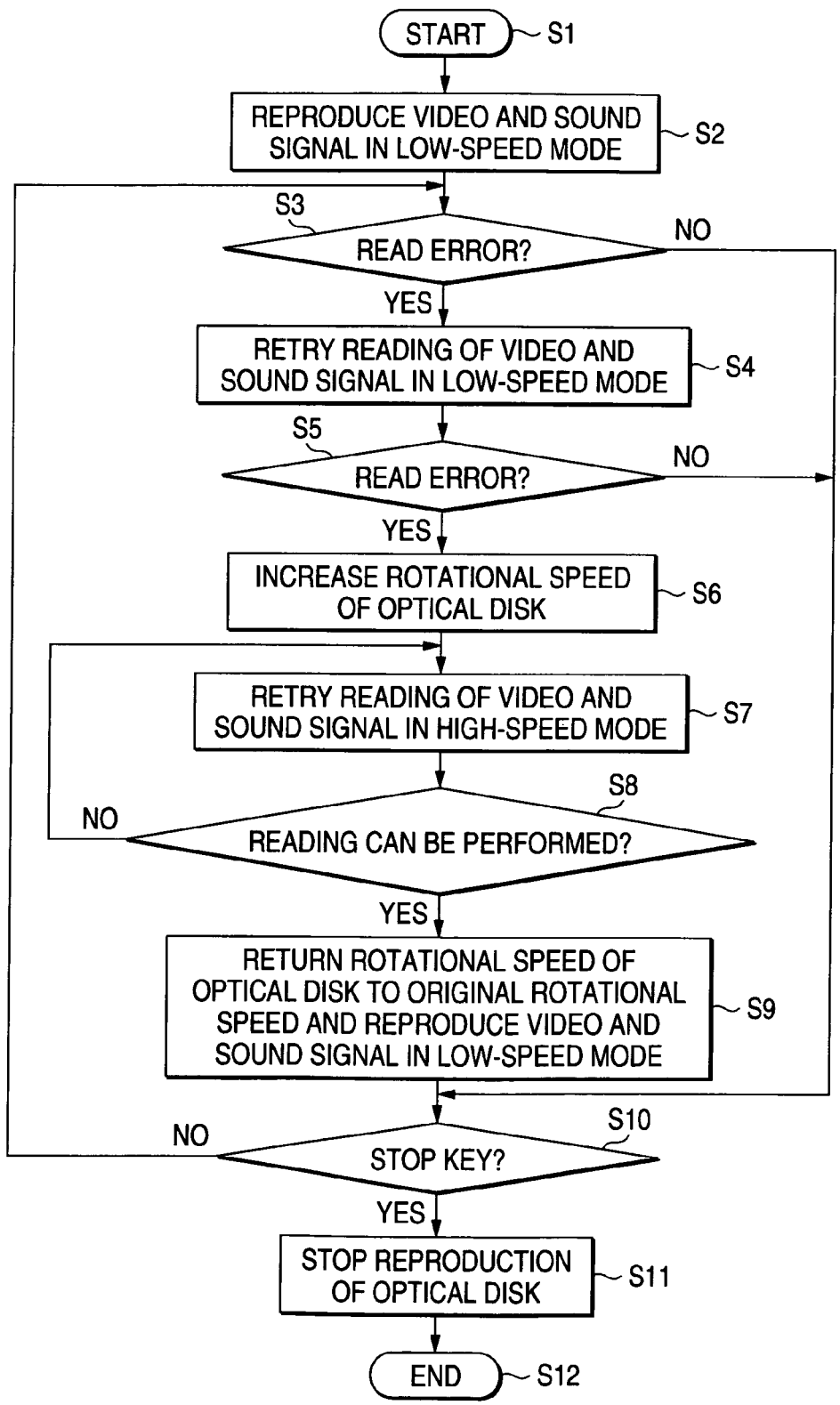
FIG. 4 is a flowchart showing an action of the disk reproducing apparatus of one embodiment of the invention.

The best mode for carrying out the invention will be described below in detail with reference to the drawings properly. FIG. 1 is a block diagram showing a configuration of a disk reproducing apparatus of one embodiment of the invention, and FIG. 2 is an explanatory diagram showing a remote control device of the disk reproducing apparatus of one embodiment of the invention, and FIG. 3 is an explanatory diagram showing an action of the disk reproducing apparatus of one embodiment of the invention, and FIG. 4 is a flowchart showing an action of the disk reproducing apparatus of one embodiment of the invention.

First, description will be made based on a block diagram showing a configuration of a disk reproducing apparatus of one embodiment of the invention of FIG. 1.

A disk reproducing apparatus 1 comprises an optical pickup 3 for optically reading a video and sound signal recorded on an optical disk 2, a spindle motor 4 for rotating the optical disk 2, a servo circuit 5 for driving the spindle motor 4 and driving a thread motor (not shown) for moving the optical pickup 3 in a radial direction of the optical disk 2 and controlling tracking and focus of the optical pickup 3, a synchronous detection and AD conversion circuit 6 for detecting synchronization of the video and sound signal read by the optical pickup 3 based on a reference clock and converting the video and sound signal of an analog signal into a digital signal, a demodulation and error correction circuit 7 for demodulating the video and sound signal converted into the digital signal and correcting an error of the demodulated video and sound signal based on an error-correcting code added to the video and sound signal, buffer memory 8 in which data of the video and sound signal reproduced is temporarily stored, a decoder 9 for expanding a video and sound signal compressed based on a predetermined compression system, for example, a JPEG (Joint Photographic Coding Experts Group) system and decoding the original video and sound signal, an encoder and DA conversion circuit 10 for encoding the decoded video and sound signal into a video and sound signal of a composite signal according to a predetermined signal system, for example, a video and sound signal of an NTSC (National Television System Committee) system and converting the encoded video and sound signal into a video and sound signal of an analog signal and outputting the video and sound signal to a monitor device 30, a microcomputer 11 for controlling the whole system of the disk reproducing apparatus 1, and a remote control receiving part 12 for receiving a remote control signal of an infrared signal sent from a remote control device 20 and converting the signal into a predetermined electrical signal.

Figure 2:
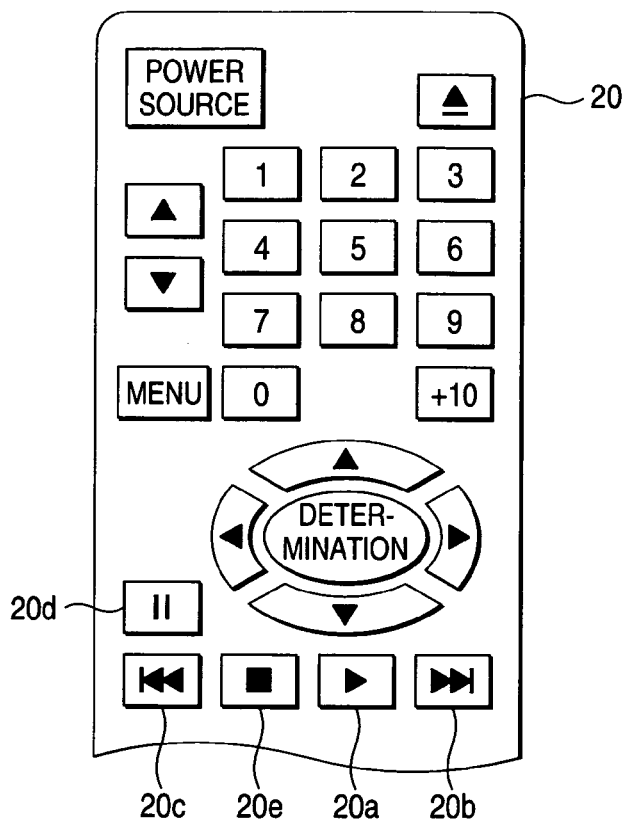
FIG. 2 is an explanatory diagram showing a remote control device of the disk reproducing apparatus of one embodiment of the invention.

Also, as shown in FIG. 2, the remote control device 20 is provided with plural operation keys such as a reproduction key 20a for commanding reproduction of a video and sound signal recorded on an optical disk, a next skip key 20b for commanding a skip to the next chapter number/title number of the video and sound signal recorded on the optical disk, a previous skip key 20c for commanding a skip to the previous chapter number/title number of the video and sound signal recorded on the optical disk, a pause key 20d for making a pause in reproduction of the video and sound signal recorded on the optical disk and a stop key 20e for commanding a stop of reproduction of the video and sound signal recorded on the optical disk, and it is constructed so that a desired action of the disk reproducing apparatus 1 can be performed by operating their operation keys.

The action of the disk reproducing apparatus configured as mentioned above will be described below.

When an operation key of the remote control device 20 is operated, a remote control signal of the operation key operated is sent from the remote control device 20 as the remote control signal of an infrared signal and is received by the remote control receiving part 12 and is converted into a predetermined electrical signal and is sent out to the microcomputer 11. When a remote control signal of the reproduction key 20a of the remote control device 20 for commanding reproduction of an optical disk is received, the microcomputer 11 sends out a control signal to the servo circuit 5, and drives the spindle motor 4 and the thread motor (not shown) in a low-speed mode, for example, at a speed equal to a transfer speed of a video and sound signal or at a speed two times the transfer speed, and reads the video and sound signal recorded on the optical disk 2 by the optical pickup 3, and reproduces the video and sound signal recorded on the optical disk 2 by the synchronous detection and AD conversion circuit 6, the demodulation and error correction circuit 7, the decoder 9, and the encoder and DA conversion circuit 10 (see FIG. 3). When a read error of the video and sound signal recorded on the optical disk occurs due to external factors such as shock or vibration or internal factors such as dirt or flaw on a signal record surface of the optical disk during reproduction of the optical disk 2, the microcomputer 11 sends out a control signal to the servo circuit 5, and drives the spindle motor 4 and the thread motor (not shown), and retries reading of the video and sound signal of a sector in which the read error of the video and sound signal occurs in a low-speed mode (see FIG. 3).

When a read error of the video and sound signal occurs during the retry of reading of the video and sound signal, the microcomputer 11 sends out a control signal to the servo circuit 5, and increases a rotational speed of the optical disk 2, and drives the spindle motor 4 and the thread motor (not shown) in a high-speed mode, for example, at a speed ten times or twelve times the transfer speed of the video and sound signal, and retries reading of the video and sound signal of a sector in which the read error of the video and sound signal occurs in a high-speed mode (see FIG. 3). Then, when the video and sound signal of the sector in which the read error of the video and sound signal occurs can be read by the retry of reading of the video and sound signal in the high-speed mode, the microcomputer 11 sends out a control signal to the servo circuit 5, and returns the rotational speed of the optical disk 2 to the original rotational speed, and drives the spindle motor 4 and the thread motor (not shown) in a low-speed mode, and reproduces the video and sound signal recorded on the optical disk 2 in the low-speed mode (see FIG. 3).

When a remote control signal of the stop key 20e of the remote control device 20 for commanding a stop of reproduction of the optical disk 2 is received, the microcomputer 11 sends out a control signal to the servo circuit 5, and stops driving of the spindle motor 4 and the thread motor (not shown), and stops reproduction of the optical disk 2. Also, when reproduction of the video and sound signal recorded on the optical disk 2 ends, the microcomputer 11 sends out a control signal to the servo circuit 5, and stops driving of the spindle motor 4 and the thread motor (not shown), and ends the reproduction of the optical disk 2.

As a result of this, since it is constructed so that a video and sound signal recorded on an optical disk is reproduced in a low-speed mode when the optical disk is reproduced, noise such as rotation noise of the optical disk, vibration noise due to side runout or eccentricity of the optical disk or wind noise due to rotation of the optical disk can be reduced and a user can view the reproduced video and sound with enjoyment in a quiet state without experiencing discomfort due to the noise associated with rotation of the optical disk. Also, since it is constructed so that when a read error of the video and sound signal occurs during reproduction of the optical disk, reading of the video and sound signal of a sector in which the read error of the video and sound signal occurs is retried and when a read error of the video and sound signal occurs during the retry of the reading of the video and sound signal, a rotational speed of the optical disk is increased to retry reading of the video and sound signal in a high-speed mode, even for buffer memory with small capacity, data of the video and sound signal stored in the buffer memory is not lost and the reproduced video and sound signal can be outputted at a constant transfer speed, so that video and sound in reproduction can be constructed so as not to discontinue even when the read error of the video and sound signal occurs during reproduction.

Also, description will be made based on a flowchart showing an action of the disk reproducing apparatus of one embodiment of the invention of FIG. 4.

When a remote control signal of a reproduction key of a remote control device for commanding reproduction of an optical disk is received, the flowchart proceeds from step S1 to step S2 and in step S2, a video and sound signal recorded on the optical disk is reproduced in a low-speed mode and the flowchart proceeds to step S3.

In step S3, it is decided whether or not a read error of the video and sound signal recorded on the optical disk occurs during the reproduction of the optical disk, and when the read error of the video and sound signal recorded on the optical disk occurs, the flowchart proceeds to step S4 and when the read error of the video and sound signal recorded on the optical disk does not occur, the flowchart proceeds to step S10.

In step S4, reading of the video and sound signal of a sector in which the read error of the video and sound signal occurs is retried in a low-speed mode and the flowchart proceeds to step S5.

In step S5, it is decided whether or not a read error of the video and sound signal occurs during the retry of the reading of the video and sound signal, and when the read error of the video and sound signal occurs, the flowchart proceeds to step S6 and when the read error of the video and sound signal does not occur and the video and sound signal of a sector in which the read error of the video and sound signal occurs can be read, the flowchart proceeds to step S10. In step S6, a rotational speed of the optical disk is increased and the flowchart proceeds to step S7.

In step S7, reading of the video and sound signal of a sector in which the read error of the video and sound signal occurs is retried in a high-speed mode and the flowchart proceeds to step S8.

In step S8, it is decided whether or not the video and sound signal of the sector in which the read error of the video and sound signal occurs can be read, and when the video and sound signal can be read, the flowchart proceeds to step S9 and when the video and sound signal cannot be read, the flowchart returns to step S7 and the steps from step S7 are repeated.

In step S9, the rotational speed of the optical disk is returned to the original rotational speed and the video and sound signal recorded on the optical disk is reproduced in a low-speed mode and the flowchart proceeds to step S10.

In step S10, it is decided whether or not a remote control signal of a stop key of the remote control device for commanding a stop of reproduction of the optical disk is received, and when the remote control signal of the stop key of the remote control device is received, the flowchart proceeds to step S11 and when the remote control signal of the stop key of the remote control device is not received, the flowchart returns to step S3 and the steps from step S3 are repeated.

In step S11, the reproduction of the optical disk is stopped and the flowchart proceeds to step S12 and the processing is ended.

The best mode for carrying out the invention has been described above in detail, but the invention is not limited to this and the modifications or improvements can be made within normal ideas of those skilled in the art. For example, the case that the video and sound signal recorded on the optical disk is reproduced in a low-speed (equal speed or double speed) mode and the video and sound signal of a sector in which a read error occurs is retried in a high-speed (ten-times speed or twelve-times speed) mode when the read error occurs during the retry of the read error has been described, but the rotational speed of the optical disk in a low-speed mode may be four-times speed or six-times speed higher than the double speed, and the rotational speed of the optical disk in a high-speed mode may be a rotational speed (for example, sixteen-times speed or twenty-four-times speed) higher than the twelve-times speed.

FIG. 1
5 SERVO CIRCUIT
6 SYNCHRONOUS DETECTION AND AD CONVERSION CIRCUIT
7 DEMODULATION AND ERROR CORRECTION CIRCUIT
8 BUFFER MEMORY
9 DECODER
10 ENCODER AND DA CONVERSION CIRCUIT
11 MICROCOMPUTER
12 REMOTE CONTROL RECEIVING PART
30 MONITOR DEVICE
FIG. 2
A1 POWER SOURCE
A2 MENU
A3 DETERMINATION
FIG. 3
A1 RETRY OF READING (HIGH-SPEED MODE)
A2 RETRY OF READING
A3 REPRODUCTION (LOW-SPEED MODE)
A4 READ ERROR
A5 ROTATIONAL SPEED OF OPTICAL DISK
A6 TIME
FIG. 4
S1 START
S2 REPRODUCE VIDEO AND SOUND SIGNAL IN LOW-SPEED MODE
S3 READ ERROR?
S4 RETRY READING OF VIDEO AND SOUND SIGNAL IN LOW-SPEED MODE
S5 READ ERROR?
S6 INCREASE ROTATIONAL SPEED OF OPTICAL DISK
S7 RETRY READING OF VIDEO AND SOUND SIGNAL IN HIGH-SPEED MODE
S8 CAN READING BE PERFORMED?

S9 RETURN ROTATIONAL SPEED OF OPTICAL DISK TO ORIGINAL ROTATIONAL SPEED AND REPRODUCE VIDEO AND SOUND SIGNAL IN LOW-SPEED MODE
S10 STOP KEY?
S11 STOP REPRODUCTION OF OPTICAL DISK
S12 END

What is claimed is:

1. A disk reproducing apparatus for reproducing a video and sound signal recorded on an optical disk, comprising:
reproducing device that reproduces the video and sound signal recorded on the optical disk in a predetermined low-speed mode;
first retry device that retries reading of the video and sound signal of a sector in which a read error occurs in the predetermined first speed mode when the read error of the video and sound signal occurs during the reproduction of the optical disk by the reproducing device;
second retry device that increases a rotational speed of the optical disk to retry reading of the video and sound signal of a sector in which a read error occurs in a predetermined second speed mode when the read error of the video and sound signal occurs during the retry of the reading of the video and sound signal by the first retry device, and
reproducing control device that returns the rotational speed of the optical disk to the original rotational speed to reproduce the video and sound signal recorded on the optical disk in the predetermined first speed mode when the video and sound signal of a sector in which a read error occurs can be read by the retry of the reading of the video and sound signal by the second retry device.

2. A disk reproducing apparatus for reproducing a video and sound signal recorded on an optical disk, comprising:
reproducing device that reproduces the video and sound signal recorded on the optical disk;
first retry device that retrying reading of the video and sound signal when a read error of the video and sound signal occurs during the reproduction of the optical disk by the reproducing device;
second retry device that increases a rotational speed of the optical disk to retry reading of the video and sound signal when a read error of the video and sound signal occurs during the retry of the reading of the video and sound signal by the first retry device, and
reproducing control device that returns the rotational speed of the optical disk to the original rotational speed to reproduce the video and sound signal recorded on the optical disk when the video and sound signal can be read by the retry of the reading of the video and sound signal by the second retry device.

3. The disk reproducing apparatus according to claim 2, wherein
the reproducing device reproduces the video and sound signal recorded on the optical disk in a predetermined first speed mode.

4. The disk reproducing apparatus according to claim 2, wherein
the first retry device retries reading of the video and sound signal of a sector in which a read error occurs in a predetermined first speed mode.

5. The disk reproducing apparatus according to claim 2, wherein
the second retry device increases a rotational speed of the optical disk to retry reading of the video and sound signal of a sector in which a read error occurs in a predetermined second speed mode.

6. The disk reproducing apparatus according to claim 2, wherein
the reproducing control device returns the rotational speed of the optical disk to the original rotational speed to reproduce the video and sound signal recorded on the optical disk in a predetermined first speed mode when the video and sound signal of a sector in which a read error occurs can be read by the retry of the reading of the video and sound signal by the second retry device.

7. A reproducing method of a disk reproducing apparatus for reproducing a video and sound signal recorded on an optical disk, comprising the steps of:
reproducing the video and sound signal recorded on the optical disk in a predetermined first speed mode;
retrying reading of the video and sound signal of a sector in which a read error occurs in a predetermined first speed mode when the read error of the video and sound signal occurs during the reproduction of the optical disk;
increasing a rotational speed of the optical disk to retry reading of the video and sound signal of a sector in which a read error occurs in a predetermined second speed mode when the read error of the video and sound signal occurs during the retry of the reading of the video and sound signal, and
returning the rotational speed of the optical disk to the original rotational speed to reproduce the video and sound signal recorded on the optical disk in a predetermined first speed mode when the reading of the video and sound signal is retried in the predetermined second speed mode and the video and sound signal of a sector in which a read error occurs can be read.

* * * * *